(12) United States Patent
Shimomura

(10) Patent No.: US 6,270,209 B1
(45) Date of Patent: Aug. 7, 2001

(54) INK TANK

(75) Inventor: Akihiko Shimomura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/526,184

(22) Filed: Mar. 15, 2000

(30) Foreign Application Priority Data

Mar. 19, 1999 (JP) .................................................. 11-075722

(51) Int. Cl.⁷ .................................................. B41J 2/175
(52) U.S. Cl. .................................................. 347/86
(58) Field of Search .................................. 347/84, 85, 86, 347/87, 50; 524/108, 424

(56) References Cited

U.S. PATENT DOCUMENTS

| 4,611,024 | 9/1986 | Wolfe | 524/366 |
| 5,245,361 | * 9/1993 | Kashimura et al. | 347/50 |
| 5,342,868 | * 8/1994 | Kimura et al. | 524/108 |

FOREIGN PATENT DOCUMENTS

| 2181391 | 4/1997 | (GB) | B41J/3/04 |
| 60-009238 | * 5/1985 | (JP) | . |
| 10-4451 | 1/1996 | (JP) | H04M/1/57 |
| 8-176158 | 7/1996 | (JP) | C07D/493/04 |
| 8-217924 | 8/1996 | (JP) | C08L/23/00 |
| 10-114842 | 5/1998 | (JP) | C08L/23/14 |

* cited by examiner

*Primary Examiner*—N. Le
*Assistant Examiner*—Michael Nghiem
(74) *Attorney, Agent, or Firm*—Fitzpatrick, Cella, Harper & Scinto

(57) ABSTRACT

An ink tank for a recording device that has good transparency and with which an ink cartridge is mounted provides good printing without causing any printing disturbances even when the ink cartridge is placed under various environmental conditions. The ink tank is molded from a polypropylene or polyethylene composition containing hydrotalcite (basic aluminum magnesium carbonate) as a neutralization agent and certain sorbitol derivatives as a nucleating agent.

9 Claims, 1 Drawing Sheet

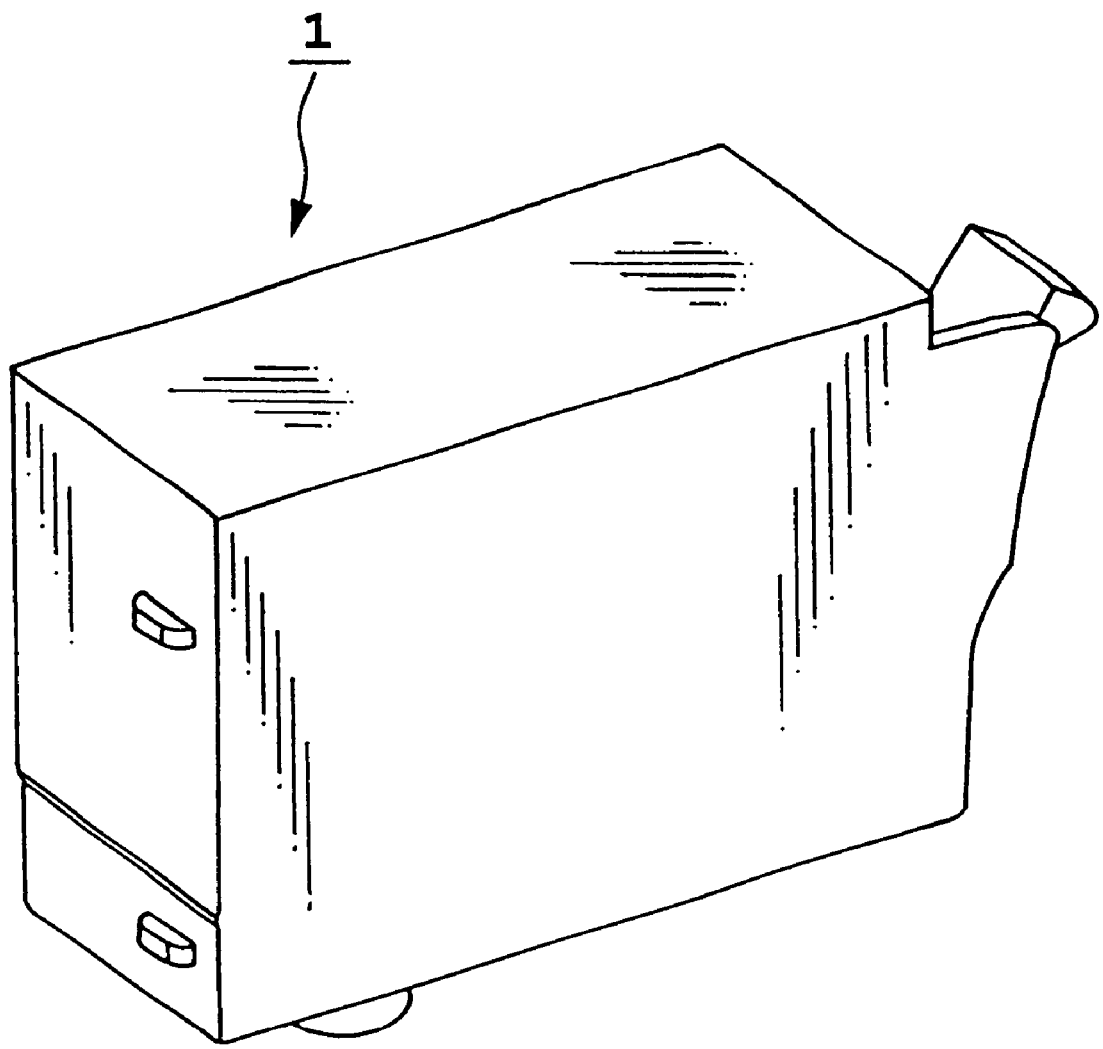
THE FIGURE

INK TANK

This application is based on Japanese Patent Application No. 11-075722 (1999) filed Mar. 19, 1999, the content of which is incorporated hereinto by reference.

BACKGROUND OF THE INVENTION

1. Field of the Invention

The present invention relates to an ink tank for recording devices, and more specifically to an ink tank composed of improved composition materials.

2. Description of the Prior Art/Related Art

Molding a container that stores liquids from polymeric materials have been applied to various technical fields.

For instance, in Japanese Patent Application Laying-open No. 8-217924 (1996), as materials to be used in film, sheet, and various molded products, polyolefin resins such as polyethylene and polypropylene are described. To these resins, various additives are added to aim at improved characteristics. In the above-mentioned publication, from the standpoint of improving processing stability and transparency, the addition of organic phosphide compounds, sorbitol compounds, and aluminum compounds at prescribed ratios to the polyolefin resins is proposed, and it has been disclosed that they are excellent materials for improving processing stability and transparency.

Furthermore, in Japanese Patent Application Laying-open No. 10-114842 (1998), a material comprising propylene polymer to which specific siloxane, sorbitol based materials, and a neutralizing agent selected from the group consisting of metal soap, hydrotalcite, aluminum silicate, zinc oxide, calcium oxide and hydroxides of Group II metals are added is proposed as a material that composes syringe barrel, plunger, tube material, and tube assemblages which require sterilization with high energy radiation. It is disclosed that the material has brittleness resistance, transparency and injection moldability.

Ink tanks for recording devices, in particular, ink tanks which store ink for ink jet recording units, are also composed of resins. As materials used for such ink tanks, a material which meets the following requirements is desired.

A material 1. which has ink resistance so that it is not dissolved by the stored ink;
2. which does not elute in the ink a part of the components of the ink tank compositional material which affects the performance of the ink;
3. which has barrier properties against the ink components so that the composition or the composition ratio of the ink do not change;
4. which possess sufficient strength to withstand the impact when the tank is dropped during handling;
5. of which the cost and the processing cost shall be moderate, since it is a supplied product; and
6. which is capable of recycling, as the consciousness towards global environmental problems have recently heightened.

Furthermore, although it depends upon the required performance for the ink jet-recording unit, there are cases in which it is necessary to have a degree of transparency where the remainder of ink inside of the tank can be optically detected.

As a material that satisfies all of the above-mentioned requirements, for instance, resins such as modified polyphenylene oxide (modified PPO: trade name: NORYL), polystyrene (PS), polybutylene terephthalate (PBT), polyethylene terephthalate (PET), polypropylene (PP), and polysulfone (PSF) have been used. In particular, in recent years, desire has heightened for materials that are recyclable and transparent, and polypropylene type resins or polyethylene type resins have been used.

However, the following phenomena were confirmed for ink tanks for which polypropylene type resins (hereinafter referred to as PP) or polyethylene type resins (hereinafter referred to as PE) were used as raw materials.

Materials having high crystallinity such as PP, PE, in particular, PP provides molded articles of which the crystallinity is not uniform, in general, and scatters the light, so the transparency of the molded article is often insufficient. In order to prevent the molded article from becoming opaque, nucleating agents are added to the material as additives. That is, the addition of a proper nucleating agent results in making the molded article into uniform and fine crystals to improve the rigidity and thermal deflection temperature of PP, as well as improving its transparency.

As such nucleating agents for PP, bis(p-methyl benzylidene)sorbitol (trade name: Gelall MD: Shin-Nihon Rika K.K.) is generally used. However, it has been found that bis(p-methyl benzylidene)sorbitol is easily eluted in ink used for the ink jet recording device. Depending on the environmental conditions, the eluted substances are sometimes deposited. And even though infrequently, the eluted substances are deposited on the ink flow channel, filter, or ink nozzle of the printer, thereby affecting the flow of the ink, and as a result, the printing.

In addition, neutralization agents are used in polyolefins such as PP and PE to prevent the influence of residues formed by the catalysts used at the time of polymerization. As neutralization agents, metal salts of fatty acids such as calcium stearate are generally used. It was found that such agents are easily eluted as well, in ink used for the ink-jet recording device. Depending on the environmental conditions, the eluted substances are sometimes deposited. And similar to the case of the nucleating agent, even though infrequently, the eluted substances are deposited on the ink flow channel, filter, or ink nozzle, thereby affecting the flow of the ink, and as a result, the printing.

Even in case of the materials described in the aforementioned patent publications, for instance, the organic phosphide compounds disclosed in Japanese Patent Application Laying-open No. 8-217924, and the siloxane disclosed in Japanese Patent Application Laying-open No. 10-114842, there is a possibility of eluting them in the ink. Even in case of the materials disclosed as being outstanding in stability and transparency, or the materials having brittleness resistance, transparency and injection moldability, they are not necessarily adequate as compositional materials for ink tanks.

As mentioned above, the depositions in the ink channel, filter, or ink nozzle, are normally discharged by cleaning operation (recovery operations such as suction, pressurization, etc.) of the recording device, and contrivance was made so that depositions would not affect the printing.

However, particularly in recent years, as the liquid droplets discharged from the ink-jet printer became smaller, trace of depositions which could no longer be removed sufficiently from the highly precise fine nozzles by the common recovery operation could cause ink flow to be disturbed. And the influence can no longer be neglected.

SUMMARY OF THE INVENTION

Under such circumstances, an object of the present invention is to provide an ink tank having low level of elution substances derived from the resin composition in the ink by using polyolefin in as the resin to which certain additives are added.

The inventors eagerly studied and finally reached the present invention.

In the first aspect of the present invention, there is provided an ink tank for recording device molded from polypropylene or polyethylene composition wherein the composition comprises hydrotalcite (basic aluminum magnesium carbonate) as a neutralizing agent and sorbitol derivatives as a nucleating agent shown by general formula (1)

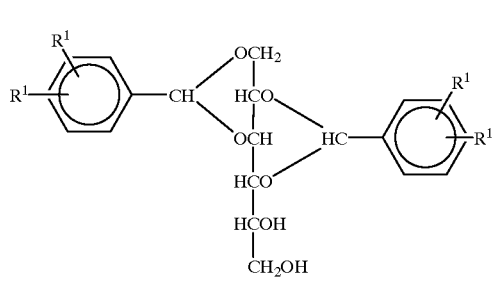

(1)

wherein $R^1$, identical or different, each represents an alkyl group having 1~10 carbon atoms, and/or general formula (2)

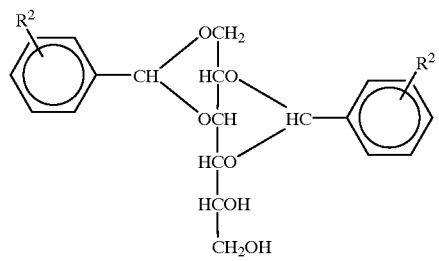

(2)

wherein $R^2$, identical or different, each represents an alkyl group having 2~10 carbon atoms.

Here, the composition may comprise 0.005~1.5 parts of hydrotalcite and 0.005~1.5 parts of the nucleating agent by weight of the polypropylene or polyethylene.

The polypropylene in the composition may be propylene homopolymer or propylene ethylene random copolymer.

The nucleating agent in the composition may be selected from the group consisting of bis(dimethyl benzylidene) sorbitol and bis(p-ethyl benzylidene)sorbitol.

The ink tank may be for ink jets.

In the second aspect of the present invention, there is provided a recording device comprising any one of the aforementioned ink tank and at least one element for mounting the ink tank in the device.

Here, the recording device may be an ink jet recording device.

The above and other objects, effects, features, and advantages of the present invention will become more apparent from the following description of embodiments thereof taken in conjunction with the accompanying drawings.

BRIEF DESCRIPTION OF THE DRAWINGS

The FIGURE is a perspective diagram showing an embodiment of the ink tank according to the resent invention.

DETAILED DESCRIPTION OF THE PREFERRED EMBODIMENTS

The PP resins used in the present invention are propylene homopolymer having an isotactic structure and propylene-α-olefin random copolymer, and they are commercially available.

Propylene-α-olefin random copolymer is a copolymer essentially consisting of 90~99.5 wt. % of propylene and 0.5~10 wt. % of α-olefins such as ethylene, butene-1, hexene-1. A propylene-ethylene random copolymer is preferable, in particular, a propylene-ethylene random copolymer having an ethylene content of 0.5~5 wt. % is preferable, and an ethylene content of 1.0~3.5 wt. % is even more preferable since it gives significant good balance between transparency and rigidity.

Furthermore, polyethylene including, for instance, LDPE, LLDPE, HDPE can also be used in the present invention.

In case the ink tank particularly requires rigidity, a propylene homopolymer is used preferably. In case the ink tank especially requires transparency, a propylene-ethylene random copolymer is used preferably.

The nucleating agents used in the present invention are sorbitol derivatives shown by general formula (1) and/or general formula (2) as below.

General formula (1) is

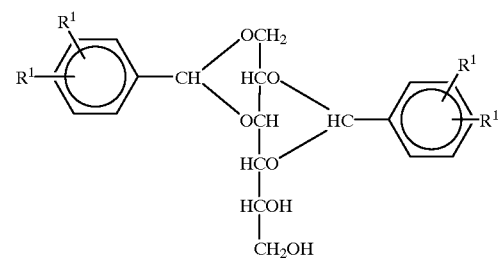

(1)

wherein $R^1$, identical or different, each represents an alkyl group having 1–10 carbon atoms.

General formula (2) is

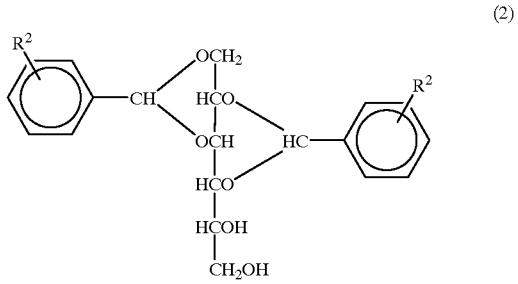

(2)

wherein $R^2$, identical or different, each represents an alkyl group having 2–10 carbon atoms.

Among the above-mentioned sorbitol derivatives, bis (dimethyl benzylidene)sorbitol and bis(p-ethyl benzylidene) sorbitol are preferable. 0.005–1.5 parts and preferably 0.05–0.8 parts of the sorbitol derivatives by weight of PP are added to PP.

In the present process, hydrotalcite is added as a neutralizing agent. The hydrotalcite used in the present invention is basic aluminum magnesium carbonate, that is, it contains both aluminum and magnesium in the structure. The amount of the hydrotalcite in the composition is 0.005–1.5 parts and preferably 0.05–0.5 parts by weight of PP.

In the present process, in addition to the above mentioned nucleating agent and hydrotalcite, antioxidants which are commonly added to PP are contained. Furthermore, various additives that are added to PP commonly such as UV absorbing agents, fillers, antistatic agents and the like may also be contained to the extent that they do not harm characteristic properties of the present invention.

The composition to which the above-mentioned additives are added according to the present invention is manufactured by mixing using conventional methods, for instance, with Henschel mixer, followed by kneading with an extruder and pelletizing. And then the pelletized composition is molded into an ink tank by conventional molding techniques such as injection molding.

There are no particular restrictions to the structure of the ink tank 1 according to the present invention. An embodiment of the present ink tank is shown in a perspective diagram as FIG. 1. More details of this structure are described in Examples 1–2 and FIGS. 1–10 of Japanese Patent Application Laying-open No. 10-4451 (1998) which is hereby incorporated by reference.

The ink contained in the ink tank according to the present invention may be used without any problems so long as the ink is one used for conventional ink-jet recording devices. Black ink comprising pure water/glycerin/hood black 2 (water-soluble black dye)/N-methyl pyrrolidone (70/15/3/12 in weight ratio) is exemplified, but it shall not be limited to this.

The present invention will be understood more readily with reference to the following examples; however these examples are intended to illustrate the invention and are not to be construed to limit the scope of the invention.

Manufacture of the Ink Tank

EXAMPLE 1

100 parts by weight of propylene-ethylene copolymer having a melt index of 10.5 and 2.5 wt. % of ethylene content was mixed with 0.2 parts by weight of bis(m, p-dimethyl benzylidene)sorbitol, 0.2 parts by weight of hydrotalcite and 0.2 parts by weight of tetrakis [methylene-3-(3', 5'-di-t-butyl-4'-hydroxyphenyl)propionate] methane (trade name: Irganox 1010), and the mixture was kneaded and extruded into pellets. And then ink tank 1 was molded from the pellets. This ink tank 1 had extremely good transparency.

EXAMPLE 2

The ink tank 1 was molded like Example 1 except that propylene-ethylene copolymer in Example 1 was replaced by propylene homopolymer having a melt index of 10.0. This ink tank 1 has slightly lower transparency than the ink tank of Example 1, but the contents in the tank can be recognized sufficiently.

EXAMPLE 3

The ink tank 1 was molded like Example 1 except that bis(m, p-dimethyl benzylidene)sorbitol in Example 1 was replaced by bis(p-ethyl benzylidene)sorbitol. This ink tank 1 had extremely good transparency.

Comparative Example 1

The ink tank 1 was molded like Example 1 except that bis(m, p-dimethyl benzylidene)sorbitol and hydrotalcite in Example 1 were replaced by bis(p-methyl benzylidene) sorbitol and Ca stearate, respectively.

Comparative Example 2

The ink tank 1 was molded like Example 1 except that bis(m, p-dimethyl benzylidene)sorbitol in Example 1 was replaced by bis(p-methyl benzylidene)sorbitol.

In order to evaluate the ink tank obtained by using the above-mentioned materials, the ink tank was immersed in yellow ink of ink cartridge BCI-20 for Canon BJ Printer, and the ink tank immersed in ink was heated in the PCT (Pressure Cooker Tester) to 121° C. The PCT was maintained at 121° C. for 10 hours and then the evaluation was conducted.

TABLE 1

PCT Ink Immersion Test

| Experiment No. | State of the ink after heating the ink tank immersed ink and allowing it to room temperature |
|---|---|
| Example 1 | No suspended matter |
| Example 2 | No suspended matter |
| Example 3 | No suspended matter |
| Comparative Example 1 | Large amount of suspended matter |
| Comparative Example 2 | Small amount of suspended matter |

As described above, the ink tank according to the present invention formed no suspended matter even in the experiments under accelerated conditions with PCT.

In each ink tank of the Examples and the Comparative Examples, the yellow ink of ink cartridge BCI-20 for Canon BJ printer was filled. After keeping the tanks at 60° C. for one month, each tank was placed in an ink-jet printer (Canon Kabushiki Kaisha, Bubble Jet Printer BJC-600), and printing was conducted by the printer until all of the ink in the printer was consumed, then the printing was evaluated.

In case ink tanks of Examples 1–3 were used, good printing was maintained to the last without any cleaning operation. In case of the ink tank of Comparative Example 1, some very small disturbances occurred in the printing, and in order to recover good printing, five cleaning operations were required. In case of the ink tanks of Comparative Examples 2–3, very small disturbances occurred in the printing, and in order to recover good printing, two cleaning operations were required.

An ink cartridge comprising the ink tank according to the present invention in which ink is filled provides good printing without causing any disturbances in the printing even when the ink cartridge is placed under various environmental conditions.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An ink tank for a recording device molded from a composition comprising: a) a polypropylene or polyethylene resin; (b) hydrotalcite (basic aluminum magnesium carbonate) as a neutralization agent; and (c) sorbitol derivatives as a nucleating agent for said polypropylene or polyethylene, said sorbitol derivatives shown by general formula (1)

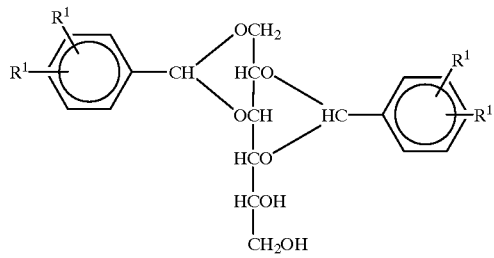

wherein $R^1$, identical or different, each represents an alkyl groups having 1–10 carbon atoms, and/or general formula (2)

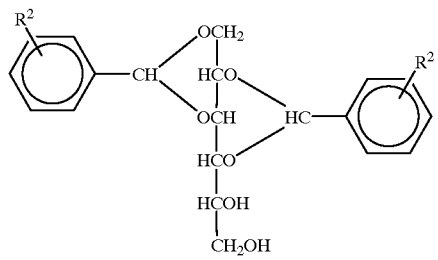

wherein $R^2$, identical or different, each represents an alkyl group having 2–10 carbon atoms.

2. The ink tank as claimed in claim 1, wherein said composition comprises 0.005–1.5 parts of said hydrotalcite and 0.005–1.5 parts of said nucleating agent by weight of said polypropylene or polyethylene.

3. The ink tank as claimed in claim 2, wherein said polypropylene is propylene homopolymer or propylene-ethylene random copolymer.

4. The ink tank as claimed in claim 3, wherein said nucleating agent is selected from the group consisting of bis(dimethyl benzylidene)sorbitol and bis(p-ethyl benzylidene)sorbitol.

5. The ink tank as claimed in claim 2, wherein said nucleating agent is selected from the group consisting of bis(dimethyl benzylidene)sorbitol and bis(p-ethyl benzylidene)sorbitol.

6. The ink tank as claimed in claim 1, wherein said nucleating agent is selected from the group consisting of bis(dimethyl benzylidene)sorbitol and bis(p-ethyl benzylidene)sorbitol.

7. The ink tank claimed in claim 1 wherein said ink tank is for ink jets.

8. A recording device comprising the ink tank claimed in claim 1 and at least one element for mounting said ink tank in said device.

9. An ink jet recording device comprising the ink tank claimed in claim 1 and at least one element for mounting said ink tank in said device.

* * * * *

UNITED STATES PATENT AND TRADEMARK OFFICE
CERTIFICATE OF CORRECTION

PATENT NO.    : 6,270,209 B1                                               Page 1 of 1
DATED         : August 7, 2001
INVENTOR(S)   : Akihiko Shimomura It is certified that error appears in the above-identified patent and that said Letters Patent is hereby corrected as shown below:

<u>Title page,</u>
Item [56] References Cited, FOREIGN PATENT DOCUMENTS
"10-4451    1/1996    (JP)." should read -- 10-4451    1/1998    (JP) --.

<u>Column 3,</u>
Line 66, "resent" should read -- present --.

<u>Column 7,</u>
Line 18, "groups" should read -- group --.

Signed and Sealed this

Fifth Day of March, 2002

Attest:

Attesting Officer

JAMES E. ROGAN
Director of the United States Patent and Trademark Office